(12) United States Patent  
Peczalski

(10) Patent No.: US 8,746,035 B2
(45) Date of Patent: Jun. 10, 2014

(54) SELF-CALIBRATING VIBRATION SENSOR

(75) Inventor: Andy Peczalski, Eden Prarie, MN (US)

(73) Assignee: Honeywell International Inc., Morristown, NJ (US)

( * ) Notice: Subject to any disclaimer, the term of this patent is extended or adjusted under 35 U.S.C. 154(b) by 284 days.

(21) Appl. No.: 13/114,852

(22) Filed: May 24, 2011

(65) Prior Publication Data

US 2011/0283768 A1 Nov. 24, 2011

Related U.S. Application Data

(60) Provisional application No. 61/347,766, filed on May 24, 2010.

(51) Int. Cl.
*G01M 1/16* (2006.01)
*G12B 13/00* (2006.01)

(52) U.S. Cl.
USPC .......................................... 73/1.82; 73/1.81

(58) Field of Classification Search
USPC ................................................. 73/1.82, 1.88
See application file for complete search history.

(56) References Cited

U.S. PATENT DOCUMENTS

| 2,796,756 | A | * | 6/1957 | Yates et al. ..................... 73/1.82 |
| 3,911,731 | A | * | 10/1975 | Walker et al. ................... 73/660 |
| 5,760,731 | A | * | 6/1998 | Holmes ......................... 342/118 |
| 6,289,735 | B1 | * | 9/2001 | Dister et al. .................... 73/579 |
| 7,823,437 | B2 | * | 11/2010 | Siebers et al. .................. 73/1.37 |
| 2005/0071128 | A1 | * | 3/2005 | Lindberg et al. .............. 702/187 |
| 2007/0194982 | A1 | * | 8/2007 | Stove ............................ 342/174 |
| 2007/0272023 | A1 | * | 11/2007 | Dwyer et al. ................... 73/649 |
| 2009/0045940 | A1 | * | 2/2009 | Sadana ....................... 340/539.1 |
| 2009/0171254 | A1 | * | 7/2009 | Kushculey et al. ............... 601/3 |
| 2009/0192668 | A1 | * | 7/2009 | Payne et al. .................... 701/35 |
| 2009/0266165 | A1 | * | 10/2009 | Greenwood .................... 73/597 |
| 2010/0063763 | A1 | * | 3/2010 | Rozelle .......................... 702/92 |
| 2010/0126275 | A1 | * | 5/2010 | Leyh et al. ..................... 73/579 |
| 2010/0329080 | A1 | * | 12/2010 | Frank et al. ..................... 367/99 |
| 2011/0270564 | A1 | * | 11/2011 | Feero ............................ 702/104 |
| 2011/0288796 | A1 | * | 11/2011 | Peczalski et al. ............... 702/56 |
| 2013/0054175 | A1 | * | 2/2013 | Saloio et al. .................. 702/105 |

FOREIGN PATENT DOCUMENTS

JP 01136032 A * 5/1989 ............. G01H 11/00

* cited by examiner

*Primary Examiner* — David A Rogers
(74) *Attorney, Agent, or Firm* — Schwegman, Lundberg & Woessner, P.A.

(57) ABSTRACT

An antenna in a radar sensor is vibrated at a known frequency and velocity in a direction generally normal to the antenna surface. A response received by the antenna is used to scale or calibrate sensor responses at frequencies of interest.

18 Claims, 5 Drawing Sheets

SELF-CALIBRATING VIBRATION SENSOR

RELATED APPLICATION

This application claims priority to U.S. Provisional Application Ser. No. 61/347,766 (entitled SELF-CALIBRATING VIBRATION SENSOR, filed May 24, 2011) which is incorporated herein by reference.

BACKGROUND

Large moving or rotating machinery requires preventive maintenance in order to schedule the replacement or repair of a part before costly breakdown and shutdown. The decision for scheduling and diagnosing the maintenance or repair is frequently made based on the new frequency or increased vibration level of the machinery. Existing vibration sensors cannot be easily placed on moving parts or in an inaccessible or small place. Technicians who scan the machinery take long time since their handheld sensor has to be attached to the machine for each point measurement. It is also desirable to scan a large part of machinery at once to speed up the diagnosis.

Radar vibration sensors have been proposed for such standoff preventive maintenance assessment. However the calibration of such a sensor is difficult for several reasons. The magnitude of the sensor response depends on the distance to the target. The magnitude of the response is roughly proportional to distance. The magnitude of the sensor response may also vary by e.g. 6 dB because of signal cancellation due to small motion over short distance, e.g., one-half wavelength of carrier frequency e.g. 6.25 mm at 24 GHz. Still further, the magnitude of the sensor response depends on the reflectivity, i.e., radar cross section, of the target.

SUMMARY

An antenna in a radar sensor is vibrated at a known frequency and velocity in a direction generally normal to the antenna surface. A response received by the antenna is used to scale or calibrate sensor responses at frequencies of interest.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
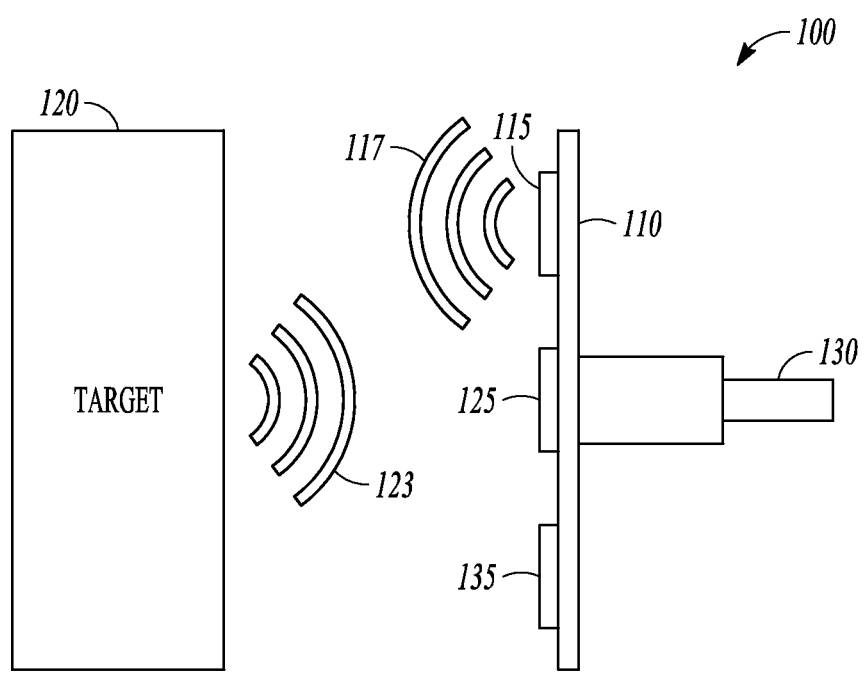
FIG. 1 is a block diagram illustrating a self calibrating radar based vibration sensor according to an example embodiment.

A self-calibrating radar based sensor is illustrated at 100 in FIG. 1. In one embodiment, a circuit board 110 is formed with a transmit antenna 115 that transmits RF signals 117 toward a target 120. The target 120 reflects the RF signals as illustrated at 123 and are received at an antenna 125 supported on circuit board 110. In one embodiment, the signals are radar signals. A vibrating mechanism 130 is coupled to vibrate the antennas at a desired frequency. The vibrations are substantially orthogonal to the target 120 to obtain an optimal reflected signal. A controller 135 may also be formed on the same circuit board 110, or may be located remotely with either a hard wired connection to the antennas or a wireless connection to control the generation of signals and provide power. Power may be provided by a battery in some embodiments.

In various embodiments, the antennas may operate at 24 GHz, since that is currently an unregulated frequency band. The wavelength of a 24 GHz signals is about 1.25 cm. The antennas may consist of a 2×4 array of half-wavelength patches in one embodiment with a field of view of 30×50 degrees. Narrower field of view antennas may also be used to create a field of view of 10 degrees or less in further embodiments using horn antennas with no side lobes.

In one embodiment, a sensor antenna is made to physically vibrate in a direction generally normal to the antenna surface with well stabilized velocity e.g. $1/100^{th}$ of a wavelength of the vibration frequency peak to peak movement with frequency 10 Hertz. Deviations from normal may be accounted for by corresponding changes in velocity of the antenna relative to normal. A sensor response at that frequency is used for shifting the relative calibration curve (stored in the memory of the sensor) up or down and is also used for scaling sensor responses at all frequencies of interest. Small adjustments of the vibration frequency e.g. 9-11 Hz may be made in case the measured signal overlaps calibration signal. In further embodiments, the velocity and frequency of movement of the antenna may be varied outside the above values. In further embodiments, the antenna may be vibrated at multiple frequencies between 1 and 10000 Hz.

Target 120 in various embodiments may include wind generator turbines, helicopter gear boxes, and various many other forms of motors, turbines, pumps and industrial equipment. Any type of vibrating mechanism 130 that provides a desired displacement at a desired frequency and direction may be used. An electromagnetically actuated piston may be used in one embodiment.

Figure 2:
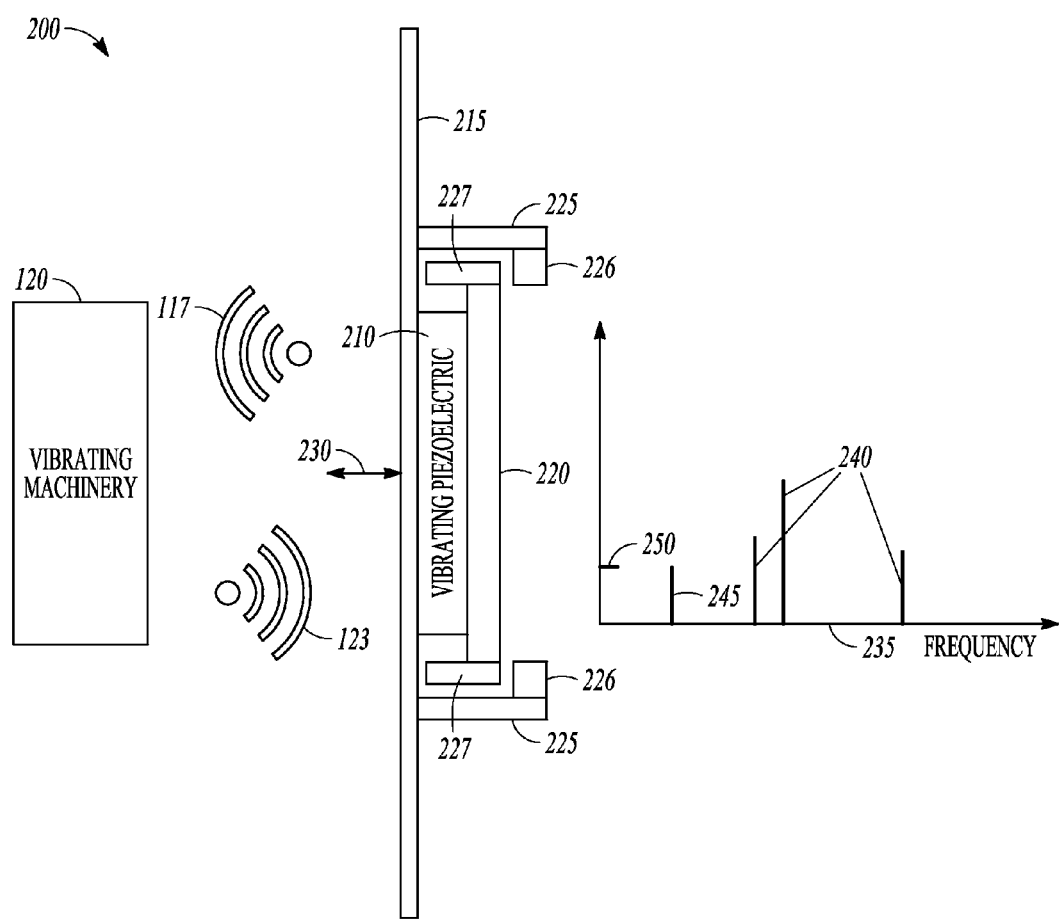
FIG. 2 is a block diagram of an alternative embodiment of a self calibrating radar based sensor according to an example embodiment.

An alternative embodiment of a self calibrated sensor is shown at 200 in FIG. 2. Sensor 200 may be utilized where higher frequencies are desired, such as for frequencies above about 500 Hz. Vibration is induced by a piezoelectric actuator 210 located between an antenna 215 and a support 220. Frequency and amplitude of the antenna movement is dependent on the supply voltage and piezoelectric properties of the actuator 210. Because the piezoelectric properties of the actuator and actuating voltage drift with time and temperature, an optional displacement limiting approach may be used.

In one embodiment, mechanical stops 225 are provided to restrict an amplitude of the movement 230 of the antenna due to expansion and contraction of actuator 210 in well a defined fashion. The stops 225 have an arm 226 that extends over support 220, and prevents the antenna from moving too far to the left as illustrated. Support 220 also arms 227 that extend toward the antenna 215 to prevent the antenna from moving too far to the right. The temperature dependency of the mechanical dimensions are stable and well understood, so they can be compensated with calibration tables. Therefore the amplitude and frequency of the vibration of the antenna are well defined and not coinciding with the observed vibration frequencies of the target as shown in the Fourier transform graph 235 of the sensor signal. Measured frequencies from vibration of the target are indicated at 240, the antenna vibration frequency 245 and amplitude 250 are also illustrated.

Figure 3:
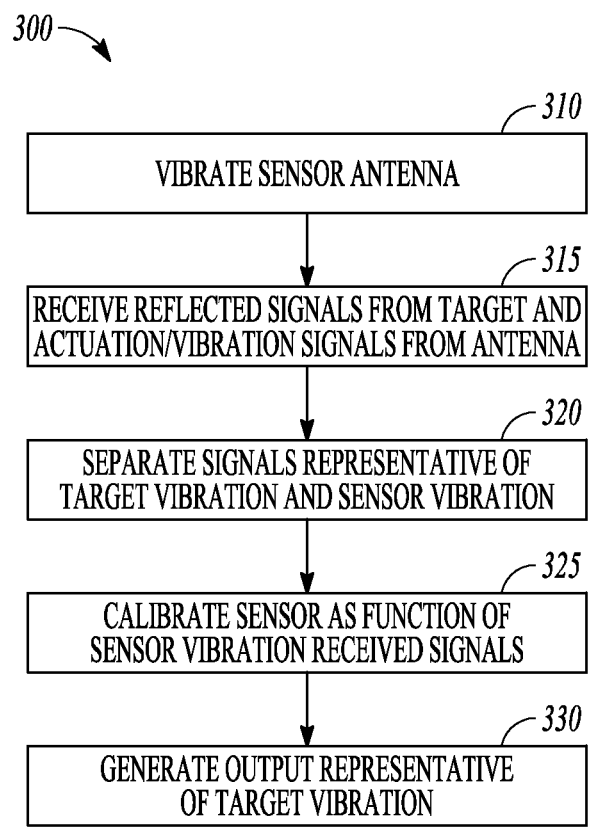
FIG. 3 is a flow chart representation of a method of calibrating the vibration sensor according to an example embodiment.

FIG. 3 is a flow chart representation of a method 300 of calibrating the vibration sensor of FIG. 1. The method may be implemented in software stored on computer readable storage devices and executed by a controller that may include a processor or other circuitry.

Method 300 starts with vibrating the sensor antenna at 310 as described above. Signals reflected from the target are received at 315. The signals include information regarding the vibration of the antennas, as well as the amplitude and frequency of vibration of the target and/or actuation voltage of an actuator that vibrates the target when the target is operating in a mode that results in vibrations as illustrated in the Fourier transform graph 235. At 320, the received signals are processed to separate out information corresponding to vibrations of the target, as well as vibrations of the antenna based on the frequency of the actuation signal.

A Fourier transform on the received signal may be performed to convert the signals into the frequency domain as shown at 235. The signals representing vibration of the antenna are used to calibrate the sensor at 325. In one embodiment, a calibration curve over a desired frequency range, or discrete calibration values at different frequencies is stored in memory accessible to the sensor 100. The calibration values may be adjusted up or down, and are used for scaling sensor responses at one or more frequencies of interest. Using the calibrated sensor at 330, an output representative of vibration of the target is generated.

In one embodiment, at 310, the vibration frequency of the antennas is adjusted such that it does not match frequencies of vibration of the target. For example, the antenna vibration frequency may be adjusted between 9-11 Hz. Alternatively calibration can be performed in real time for each frequency of the target vibration. Individual values may be selected for each vibration frequency. There may be corresponding calibration values for each such frequency. It may be done on a point by point basis, where each point may be selected such that it does not match target vibration frequencies. Other frequencies may also be used for embodiments utilizing other actuating mechanisms, such as the piezoelectric actuator 210. When target signals are received at various frequencies, calibration may be performed based on an interpolation of the calibration values at frequencies on either side of the frequency of the target signal. Other methods of calibrating based on equations representing calibration curves may alternatively be performed.

Figure 4:
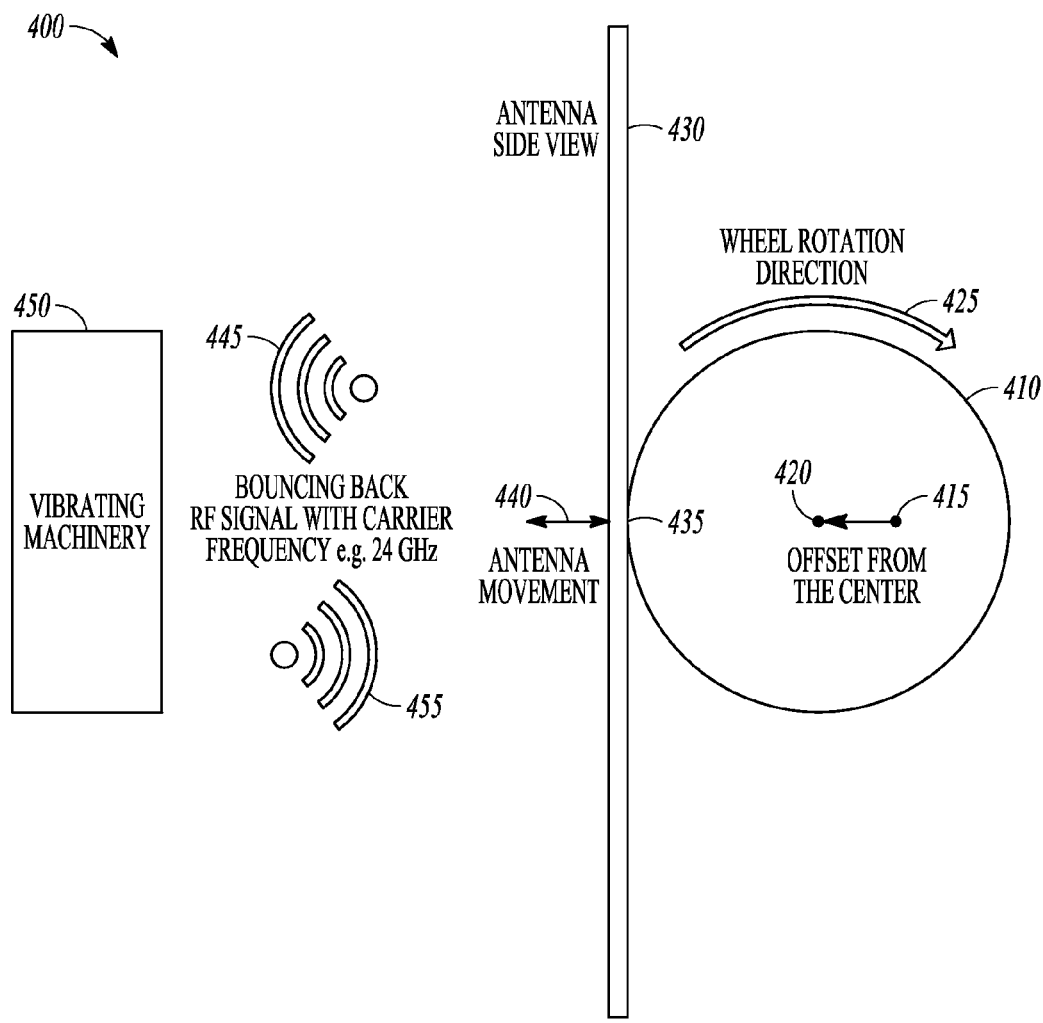
FIG. 4 is a block diagram illustrating an alternative self calibrating radar based vibration sensor according to an example embodiment.

FIG. 4 is a block diagram illustrating an alternative self calibrating radar based vibration sensor at 400 according to an example embodiment. The self calibrating radar sensor 400 may include a rotating wheel 410 with the axis 415 offset from a center 420 of the wheel by about $\frac{1}{100}^{th}$ the wavelength of the desired frequency of vibration in one embodiment. When the wheel rotates as indicated at 425 with frequency of e.g. 10 Hz an antenna 430 that is touching one side of the wheel as indicated at 435 will be moving perpendicularly to the plane of antenna as illustrated by double sided arrow 440, resulting in transmitted RF signals 445 that are reflected by a vibrating target 450. Reflected signals 455 are received by the antenna 230.

The exact velocity of the antenna 430 is known at each moment because the rotation of the wheel 410 is well controlled. Sampling of the sensor signal at 20 Hz or higher speed and signal processing provides a Fourier transform amplitude of the calibrating motion. The self calibrating amplitude may be used to adjust the gauge of the sensor for all frequencies of interest based on a prerecorded relative calibration curve. The self calibration may be done frequently for a handheld device to provide updates faster than involuntary or intentional movement of the hand e.g. 10 Hz. The self calibration updates may be less frequent or done just during installation for the stationary sensor. Other means of providing known motion to the antenna may include many different types of actuators such as piezoelectric, pneumatic, electromagnetic and other forms of imparting controlled motion to the antenna.

Figure 5:
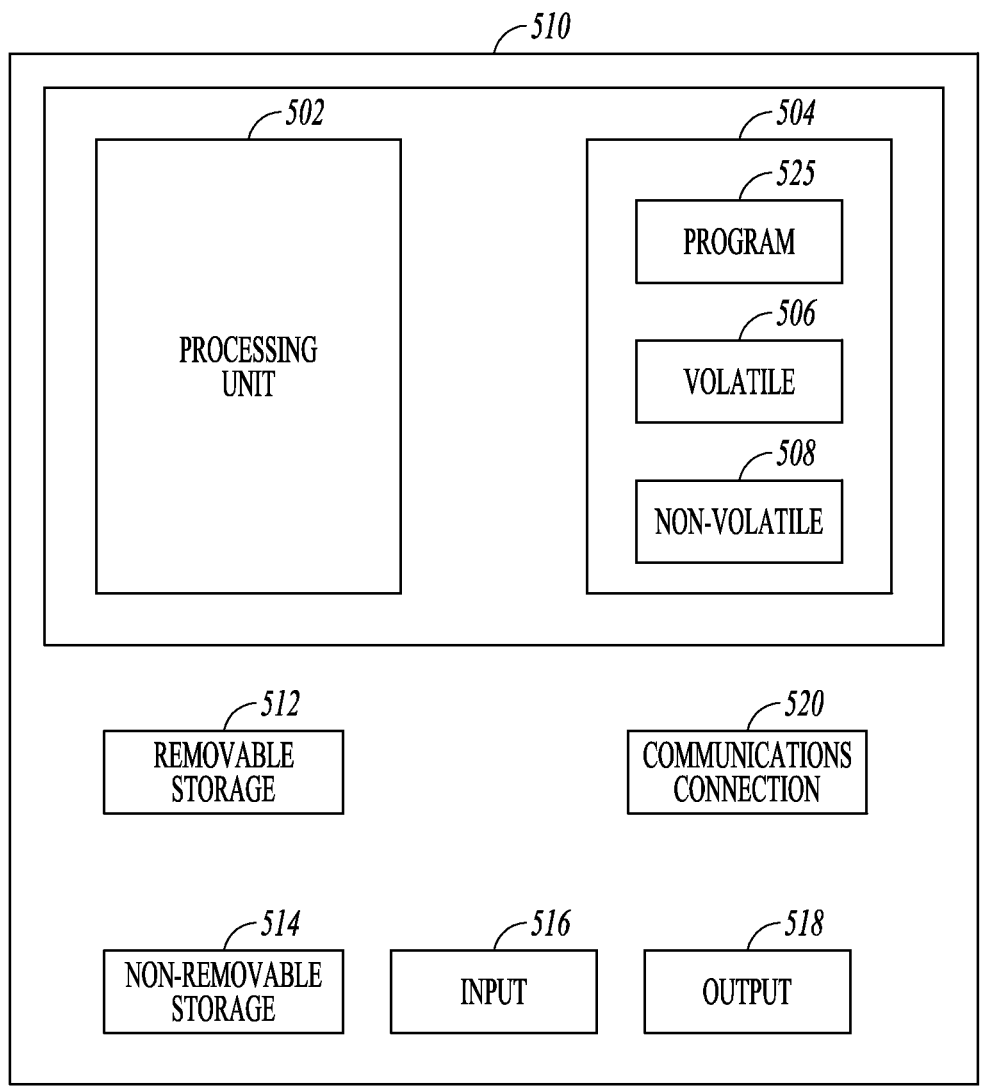
FIG. 5 is a block diagram of computer system for executing one or more methods according to an example embodiment.

A block diagram of a computer system that executes programming for performing the above algorithm is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions to execute methods and algorithms described above may be stored on a computer-readable medium such as illustrated at a program storage device 525 are executable by the processing unit 502 of the computer 510. A hard drive, CD-ROM, and RAM are some examples of articles including a computer-readable medium.

In one embodiment, a user interface is provided, such as a touchscreen device for providing both input 516 and output 518.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
a vibration sensor having an antenna to transmit and receive RF energy;
a self calibration actuator to vibrate the antenna in a direction generally normal to the antenna surface; and
a calibration module to receive responses received by the antenna to calibrate the vibration sensor;
wherein the self calibration actuator comprises a rotating wheel having an offset center of rotation.

2. The system of claim 1 wherein the responses are used to modify calibration values.

3. The system of claim 2 wherein the calibration module further extrapolates between calibration values to calibrate responses received corresponding to vibration of a target.

4. The system of claim 1 wherein the self calibration vibrator comprises a piezoelectric actuator.

5. The system of claim 1 wherein the responses are received from sampling of the received RF energy at a frequency of at least 20 Hz.

6. The system of claim 1 wherein the antenna is vibrated at multiple frequencies between 1 and 10000 Hz.

7. The system of claim 1 and further comprising mechanical stops to limit antenna vibration displacement in both directions of vibration.

8. A method comprising:
transmitting and receiving RF energy from an antenna of an RF vibration sensor toward a target;
moving the antenna orthogonal to the target at a known velocity; and
adjusting a calibration of the RF vibration sensor responsive to received signals while moving the antenna;
wherein the antenna is moved by a rotating wheel having an offset center of rotation.

9. The method of claim 8 wherein moving the antenna comprises vibrating the antenna at a known frequency and displacement generally normal to the surface of the antenna.

10. The method of claim 9 wherein the received signals are used to modify calibration values.

11. The method of claim 8 wherein the antenna is moved by a piezoelectric actuator.

12. The method of claim 8 wherein the received signals are received from sampling of the received RF energy at a frequency of at least 20 Hz.

13. The method of claim 8 wherein the antenna is vibrated at multiple frequencies between 1 and 10000 Hz.

14. The method of claim 8 and further comprising limiting antenna movement in two directions using mechanical stops.

15. The method of claim 8 wherein the received signals are subjected to a Fourier transform and separated into signals generated from vibration of the target and signals generated from movement of the antenna.

16. A computer readable storage device having instructions stored thereon to cause a computer system to control a method, the method comprising:
transmitting and receiving RF energy from an antenna of a radar based vibration sensor toward a vibrating target;
vibrating the antenna orthogonal to the target at a known frequency and displacement; and
adjusting a calibration of the radar vibration sensor responsive to received signals;
wherein the antenna is moved by a rotating wheel having an offset center of rotation.

17. The computer readable storage device of claim 16 wherein the received signals are subjected to a Fourier transform and separated into signals generated from vibration of the target and signals generated from movement of the antenna, and where signals generated from vibration of the movement of the antenna are used to modify a calibration curve.

18. The computer readable storage device of claim 16 wherein the received signals are received from sampling of the received RF energy at a frequency of at least 20 Hz and wherein the antenna is vibrated at multiple frequencies between 1 and 10000 Hz.

* * * * *